(12) United States Patent   (10) Patent No.: US 8,201,673 B2
Caamano et al.   (45) Date of Patent: Jun. 19, 2012

(54) TEMPERATURE CONTROL SYSTEM FOR ELECTRICAL CORD REEL

(75) Inventors: Ramon A Caamano, Gilroy, CA (US); James B. A. Tracey, Austin, TX (US)

(73) Assignee: Great Stuff, Inc., Austin, TX (US)

( * ) Notice: Subject to any disclaimer, the term of this patent is extended or adjusted under 35 U.S.C. 154(b) by 0 days.

(21) Appl. No.: 13/032,531

(22) Filed: Feb. 22, 2011

(65) Prior Publication Data

US 2011/0141634 A1  Jun. 16, 2011

Related U.S. Application Data

(63) Continuation of application No. 12/199,184, filed on Aug. 27, 2008, now abandoned.

(51) Int. Cl.
*H02G 11/00* (2006.01)

(52) U.S. Cl. .................................. 191/12.2 R

(58) Field of Classification Search ............. 191/12.2 R, 191/12.4, 12.2 A, 12 R; 242/370, 223, 227, 242/387, 403, 397, 398, 390, 390.8, 390.9, 242/420; 361/42, 103, 105, 106; 337/99, 337/100, 101, 102, 105, 362, 363; 340/584
See application file for complete search history.

(56) References Cited

U.S. PATENT DOCUMENTS

| | | |
|---|---|---|
| 1,746,995 A | 2/1930 | Edwards |
| 2,494,003 A | 1/1950 | Russ |
| 2,540,434 A | 2/1951 | Fengler |
| 2,855,163 A | 10/1958 | Powers |
| 2,933,264 A | 4/1960 | Bullen et al. |
| 3,101,846 A | 8/1963 | Eifrid |
| 3,147,833 A | 9/1964 | McWilliams et al. |
| 3,156,998 A | 11/1964 | McDaniel |
| 3,224,705 A | 12/1965 | Nash |
| 3,469,801 A | 9/1969 | Hauck et al. |
| 3,493,105 A | 2/1970 | Greb et al. |
| 3,617,659 A | 11/1971 | Freeman |

(Continued)

FOREIGN PATENT DOCUMENTS

DE  765071  5/1954

(Continued)

OTHER PUBLICATIONS

Business Week, "Concepts—Capital Ideas," pp. 116-117 (Jun. 12, 2000).

(Continued)

*Primary Examiner* — Mark Le

(74) *Attorney, Agent, or Firm* — Knobbe Martens Olson & Bear LLP

(57) ABSTRACT

A reel assembly for an electrical cord distinct from the reel assembly includes a reel onto which the electrical cord can be spooled. A power connector configured to be mechanically and electrically coupled to the electrical cord is on the reel. The reel assembly is configured to be connected to a power source and to convey electrical power from the power source to the power connector. Two or more switches are connected in a parallel arrangement such that electrical currents flow through the switches in the same direction when the switches are in positions that permit electrical current flow through the switches. The switches are configured to shut off power from the power source to the power connector if a temperature of the reel assembly or of the electrical cord exceeds a threshold.

19 Claims, 15 Drawing Sheets

U.S. PATENT DOCUMENTS

| | | |
|---|---|---|
| 3,619,518 A | 11/1971 | Blanch et al. |
| 3,670,977 A | 6/1972 | Boneck |
| 3,715,526 A | 2/1973 | Blanch et al. |
| 3,780,963 A | 12/1973 | Hirschfelder |
| 3,808,382 A | 4/1974 | Blanch et al. |
| 3,813,501 A | 5/1974 | Meletti et al. |
| 3,826,879 A | 7/1974 | Penn et al. |
| 3,929,210 A | 12/1975 | Cutler et al. |
| 4,008,791 A | 2/1977 | Shafii-Kahany et al. |
| 4,114,736 A | 9/1978 | Scherenberg |
| 4,138,177 A | 2/1979 | van Valer |
| 4,282,954 A | 8/1981 | Hill |
| 4,300,665 A | 11/1981 | Arechaga |
| 4,350,830 A | 9/1982 | Childress et al. |
| 4,407,460 A | 10/1983 | Khudaverdian |
| 4,467,979 A | 8/1984 | Koehler |
| 4,520,239 A | 5/1985 | Schwartz |
| 4,656,320 A | 4/1987 | Maddock |
| 4,725,697 A | 2/1988 | Kovacik et al. |
| 4,726,538 A | 2/1988 | Kovacik et al. |
| 4,904,205 A | 2/1990 | Rice |
| 5,023,744 A | 6/1991 | Hofsass |
| 5,101,082 A | 3/1992 | Simmons et al. |
| 5,158,450 A | 10/1992 | Horita et al. |
| 5,209,420 A | 5/1993 | Simmons et al. |
| 5,645,147 A | 7/1997 | Kovacik et al. |
| 5,662,193 A | 9/1997 | Ness |
| 5,669,471 A | 9/1997 | Unze |
| 5,683,054 A | 11/1997 | Chen |
| 5,701,981 A | 12/1997 | Marshall et al. |
| 5,841,617 A | 11/1998 | Watkins et al. |
| 5,855,262 A | 1/1999 | Jackson |
| 5,934,598 A | 8/1999 | Kovacik et al. |
| 6,009,588 A | 1/2000 | Rutkowski |
| 6,015,110 A | 1/2000 | Lai |
| D419,961 S | 2/2000 | Weatherill |
| 6,059,081 A | 5/2000 | Patterson et al. |
| 6,065,708 A | 5/2000 | Matsubara |
| 6,135,254 A | 10/2000 | Liao |
| 6,170,775 B1 | 1/2001 | Kovacik et al. |
| 6,179,104 B1 | 1/2001 | Steinmüller et al. |
| 6,273,354 B1 | 8/2001 | Kovacik et al. |
| 6,279,848 B1 | 8/2001 | Mead, Jr. |
| 6,981,670 B2 | 1/2006 | Harrington |
| 7,419,038 B2 | 9/2008 | Caamano et al. |
| 2004/0231723 A1 | 11/2004 | Harrington et al. |
| 2005/0225288 A1 | 10/2005 | Cole et al. |
| 2007/0024237 A1 | 2/2007 | Cole et al. |

FOREIGN PATENT DOCUMENTS

| | | | |
|---|---|---|---|
| DE | 19504873 C1 | | 2/1996 |
| DE | 19808820 C1 | | 9/1999 |
| FR | 2443413 | | 12/1978 |
| FR | 2 826 352 | | 6/2001 |
| JP | 52-48082 | | 4/1977 |
| JP | 3-11376 | | 7/1991 |
| JP | 4-322116 | | 11/1992 |
| JP | 6-100247 | | 4/1994 |
| JP | 6-249451 | * | 9/1994 |
| JP | 9-56310 | * | 3/1997 |
| WO | WO 99/05056 A | | 2/1999 |
| WO | WO 2004/080161 A | | 9/2004 |
| WO | WO 2011/080811 | * | 7/2011 |

OTHER PUBLICATIONS

English translation of German patent 195 04 873 C1; Publication Date: Feb. 29, 1996; Applicant: Benz.

Machine translation of Lagnel FR 2 826 352 obtained from http://babelfish.yahoo.com Jun. 2001.

* cited by examiner

TEMPERATURE CONTROL SYSTEM FOR ELECTRICAL CORD REEL

CLAIM FOR PRIORITY

This application is a continuation application of, and claims priority to, U.S. patent application Ser. No. 12/199,184, filed Aug. 27, 2008, now abandoned which claims priority to U.S. patent application Ser. No. 11/187,187, filed Jul. 21, 2005, (now issued as U.S. Pat. No. 7,419,038 to Caamaño et al.) which claims priority to U.S. Provisional Patent Application Ser. No. 60/686,236, filed May 31, 2005.

INCORPORATION BY REFERENCE

This application incorporates by reference the full disclosures of U.S. Provisional Patent Application Ser. No. 60/585,042, filed Jul. 2, 2004 (which is substantially similar in disclosure to, and which provides priority to, U.S. Pat. No. 7,350,736 to Caamaño et al.); U.S. Patent Application Publication No. US 2004/0231723 A1 to Harrington et al. (now issued as U.S. Pat. No. 7,503,338); U.S. Patent Application Publication No. US 2004/0206849 A1 to Harrington (now issued as U.S. Pat. No. 6,981,670); U.S. Provisional Patent Application Ser. No. 60/686,236, filed May 31, 2005; and U.S. patent application Ser. No. 11/187,187, filed Jul. 21, 2005 (now issued as U.S. Pat. No. 7,419,038 to Caamaño et al.).

BACKGROUND OF THE INVENTION

1. Field of the Invention

The invention relates generally to reels for spooling linear material and specifically to reels enclosed within housings.

2. Description of the Related Art

A reel typically comprises a cylindrical reel drum onto which a flexible linear material (such as cord, hose, etc.) is spooled. The drum ordinarily rotates about a central axis to wind or unwind (also referred to herein as spooling and unspooling) the linear material with respect to the cylindrical drum surface. Some reels include housings that protect the drum and spooled linear material from the environment. The housing may include an opening or aperture through which the linear material extends, so that it may be pulled from the housing and subsequently retracted back into the housing.

Some reel housings have a portion that includes the linear material aperture and is movable with respect to the remainder of the housing, thereby permitting a user to change the position from which the linear material is pulled from the reel. For example, U.S. Pat. No. 6,279,848 to Mead discloses a cylindrical reel drum that rotates about a horizontal axis and is enclosed within a spherical housing comprising upper and lower semispherical shell portions. The upper shell portion includes a guide aperture for the spooled linear material and is linked to the drum. The upper shell portion and drum together rotate about a vertical central axis with respect to the lower shell portion. This permits a user to pull the linear material out of the housing through the guide aperture, and move around the reel with the guide aperture following the radial position of the user. The upper shell portion and drum form a unit that is freely rotatable (about the vertical axis) with respect to the lower shell portion, through 360° and more.

A variety of electrical cord reels include spring return mechanisms for automatically spooling the linear material. Typically, a coil of flat spring steel stock is provided with one end secured to the reel drum and the other end secured to a spindle on which the drum rotates. For example, U.S. Pat. No. 6,273,354 to Kovacik et al. discloses such a reel. Such reels are often provided with a ratchet and pawl mechanism (or similar apparatus) for permitting the user to initiate rewinding of the reel by a slight tug on the linear material.

SUMMARY OF THE INVENTION

In one aspect, the invention provides a reel comprising first, second, and middle housing portions, a drum onto which a linear material can be spooled, and a spindle member having a first end connected to the first housing portion and a second end connected to the second housing portion. The spindle member extends through an opening in the drum so that the drum is rotatable about a spindle axis defined by the spindle member. The middle housing portion encircles the drum and is positioned between the first and second housing portions. The middle housing portion has an aperture through which linear material can extend, and is rotatable about the spindle axis independently of the drum. The first, second, and middle housing portions collectively form a housing for the drum.

In another aspect, the invention provides a reel comprising first, second, and middle housing portions, a drum onto which a linear material can be spooled, an elongated spindle member, and one or more support structures secured to at least one of the housing portions. The spindle member has a first end connected to the first housing portion and a second end connected to the second housing portion. The spindle member extends through an opening in the drum so that the drum is rotatable about a spindle axis defined by the spindle member. The middle housing portion encircles the drum and is positioned between the first and second housing portions. The middle housing portion has an aperture through which linear material can extend, and is rotatable about the spindle axis independently of the drum. The one or more support structures are configured to prevent the housing portions from contacting a generally planar support surface regardless of the orientation of the reel.

In another aspect, the invention provides a reel comprising a drum onto which a linear material can be spooled, first, second, and middle housing portions, a spindle member having a first end connected to the first housing portion and a second end connected to the second housing portion, a motor, and a solenoid. The spindle member extends through an opening in the drum so that the drum is rotatable about a spindle axis defined by the spindle member. The middle housing portion encircles the drum and is positioned between the first and second housing portions. The middle housing portion has an aperture through which linear material can extend, and is rotatable about the spindle axis independently of the drum. The motor is configured to produce rotation of the drum in a first direction for spooling linear material onto the drum, and a second direction opposite the first direction for unspooling linear material from the drum. The solenoid has a first position in which the solenoid restricts rotation of the middle housing portion with respect to the first housing portion, and a second position in which the solenoid does not restrict rotation of the middle housing portion. The solenoid is configured to move to the first position when the motor causes the drum to rotate in the first direction.

In another aspect, the invention provides a reel comprising a drum onto which an electrical cord can be spooled, a power connector on the drum for connection to the cord, first and second housing portions, a spindle member, one or more switches, and a middle housing portion encircling the drum and positioned between the first and second housing portions. The spindle member has a first end connected to the first housing portion and a second end connected to the second housing portion, the spindle member extending through an opening in the drum so that the drum is rotatable about a spindle axis defined by the spindle member. The middle housing portion has an aperture through which linear material can extend. The middle housing portion is rotatable about the spindle axis independently of the drum. The one or more switches are configured to sense a temperature of the reel and shut off electrical power supplied to the power connector in response to detecting a temperature that exceeds a threshold.

In still another aspect, the invention provides a method of reeling linear material, comprising providing a spool of linear material on a drum; providing first and second housing portions; rotating the drum about a spindle axis defined by a spindle member having a first end connected to the first housing portion and a second end connected to the second housing portion, the spindle member extending through an opening in the drum; providing a middle housing portion between the first and second housing portions, the middle housing portion having an aperture through which the linear material extends, the first, second, and middle housing portions collectively forming a housing for the drum; rotating the middle housing portion independently of the drum about the spindle axis.

In still another aspect, the invention provides an apparatus for mounting to a reel housing having a plurality of housing portions that collectively surround a reel drum, the apparatus comprising first and second support structures. The first support structure is configured to mount to a lower housing portion of the reel housing. The first support structure comprises two elongated handle portions configured to be positioned generally on opposing sides of the lower housing portion. The first support structure is configured to support the reel housing on a lower generally flat support surface. The second support structure is configured to mount to an upper housing portion of the reel housing. The second support structure comprises two elongated handle portions configured to be positioned generally on opposing sides of the upper housing portion. The second support structure is configured to support the reel housing on a lower generally flat support surface when the reel housing is upside down. The first and second support structures are configured to prevent the reel housing from contacting a generally flat surface regardless of the orientation of the reel housing.

For purposes of summarizing the invention and the advantages achieved over the prior art, certain objects and advantages of the invention have been described above and as further described below. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENTS

Embodiments of the present invention provide a reel comprising a reel drum enclosed within a housing having a portion with a guide aperture for receiving and guiding spooled linear material, wherein the guide aperture housing portion is rotatable about the same axis of rotation of the drum, and wherein the drum and guide aperture housing portion are independently rotatable. In preferred embodiments, the guide aperture housing portion is freely rotatable through at least 360° with respect to a remainder of the housing.

Figure 1:
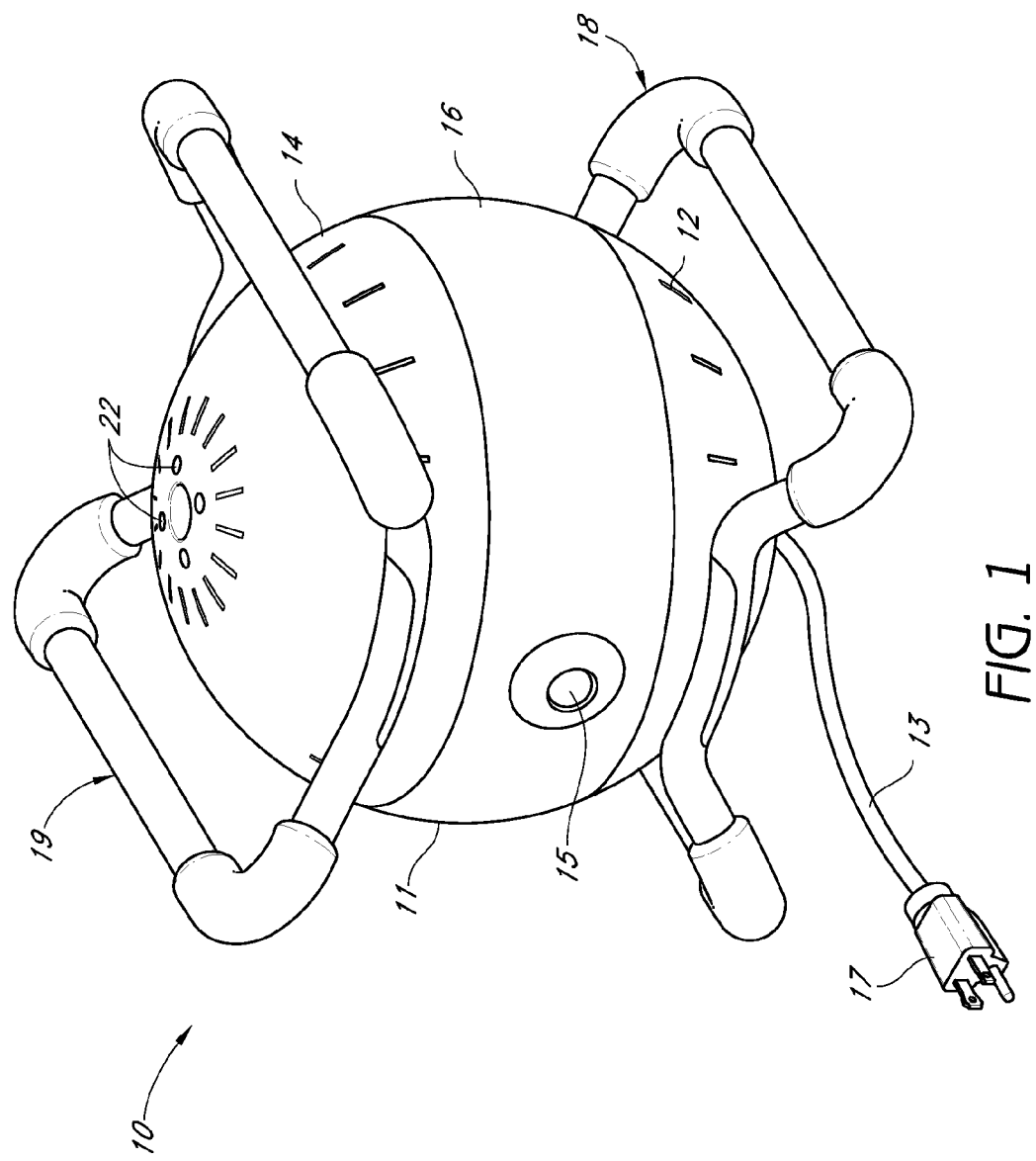
FIG. 1 is a perspective view of a reel according to one embodiment of the present invention.

FIG. 1 shows a reel 10 according to one embodiment of the present invention. The reel 10 comprises a housing 11 enclosing a rotatable reel drum 20 (FIGS. 2, 3, 5, 8, and 9) onto which a flexible linear material 2 can be spooled. In the illustrated embodiment, the linear material 2 comprises an electrical cord with a female plug connector 3, as known in the art. The housing 11 comprises a first or lower housing portion 12, a second or upper housing portion 14, and a middle housing portion 16 interposed therebetween. In the illustrated embodiment, the housing portions 12, 14, and 16 collectively form a substantially spherical shape. However, the housing 11 can have other shapes, giving due consideration to the goal of collectively substantially surrounding and preferably enclosing the drum 20. The reel 10 also includes a first or lower support structure 18 mounted to the lower housing portion 12, as well as a second or upper support structure 19 mounted to the upper housing portion 14. The lower support structure 18 is configured to support the reel 10 on a lower support surface. In a preferred embodiment, the reel is capable of operating upside down, and the upper support structure 19 is also configured to support the reel 10 on a lower support surface. As explained in further detail below, the middle housing portion 16 includes an aperture 15 through which the linear material 2 can extend.

As mentioned above, in a preferred embodiment the reel 10 is adapted to spool electrical cord 2 and provide electrical power to the cord from an external electrical power outlet. In the embodiment of FIG. 1, the reel 10 includes an electrical cable 13 that extends out of a lower opening (not shown) of the lower housing portion 12. The cable 13 preferably includes a standard electrical plug 17 that is adapted to plug into a standard electrical power outlet. The cable 13 preferably provides power to the electrical cord 2 spooled on the reel 10. While the illustrated connectors 3 and 17 are respectively female and male, these "genders" can be reversed.

Figure 2:
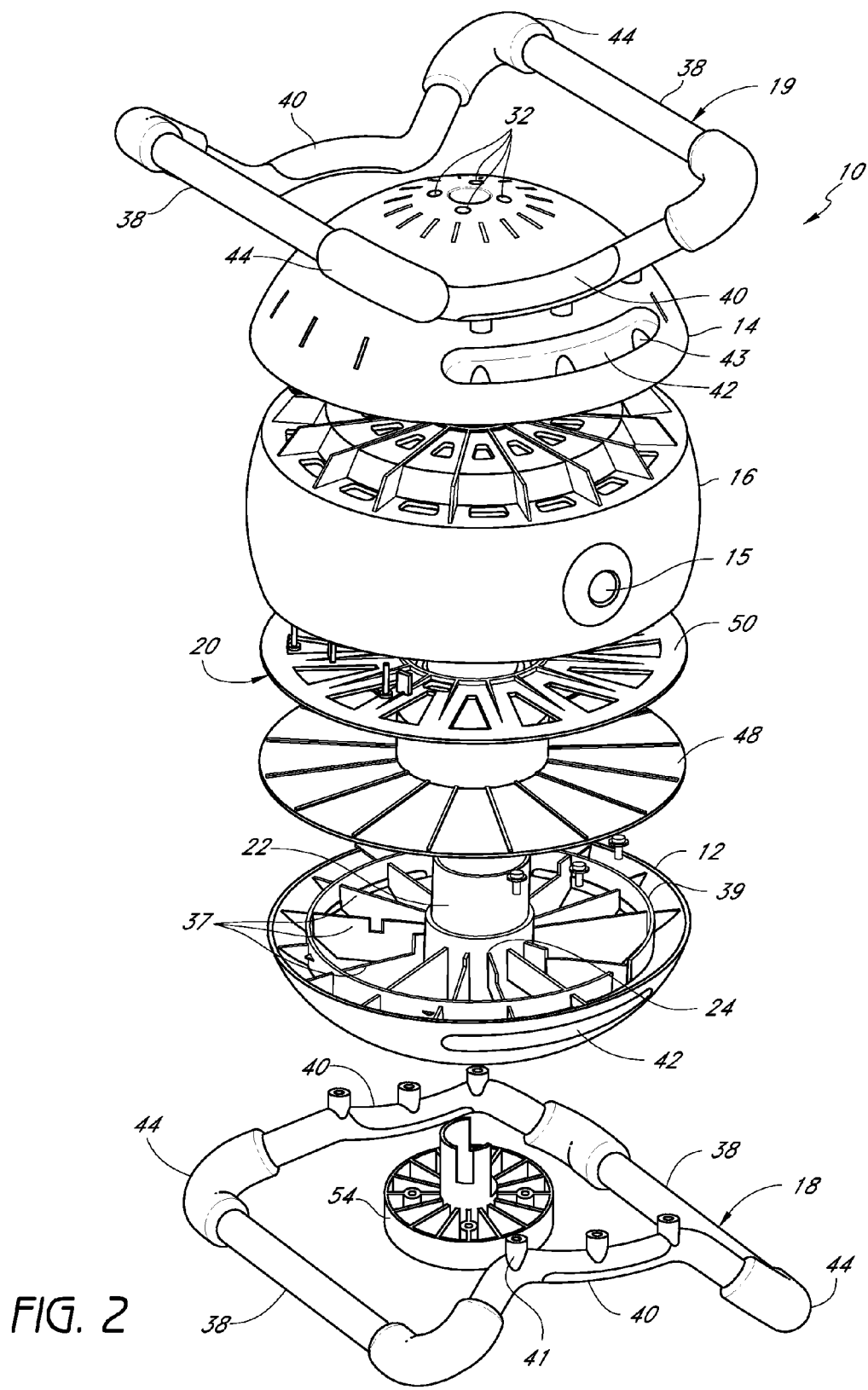
FIG. 2 is an exploded top perspective view of the reel of FIG. 1.
Figure 3:
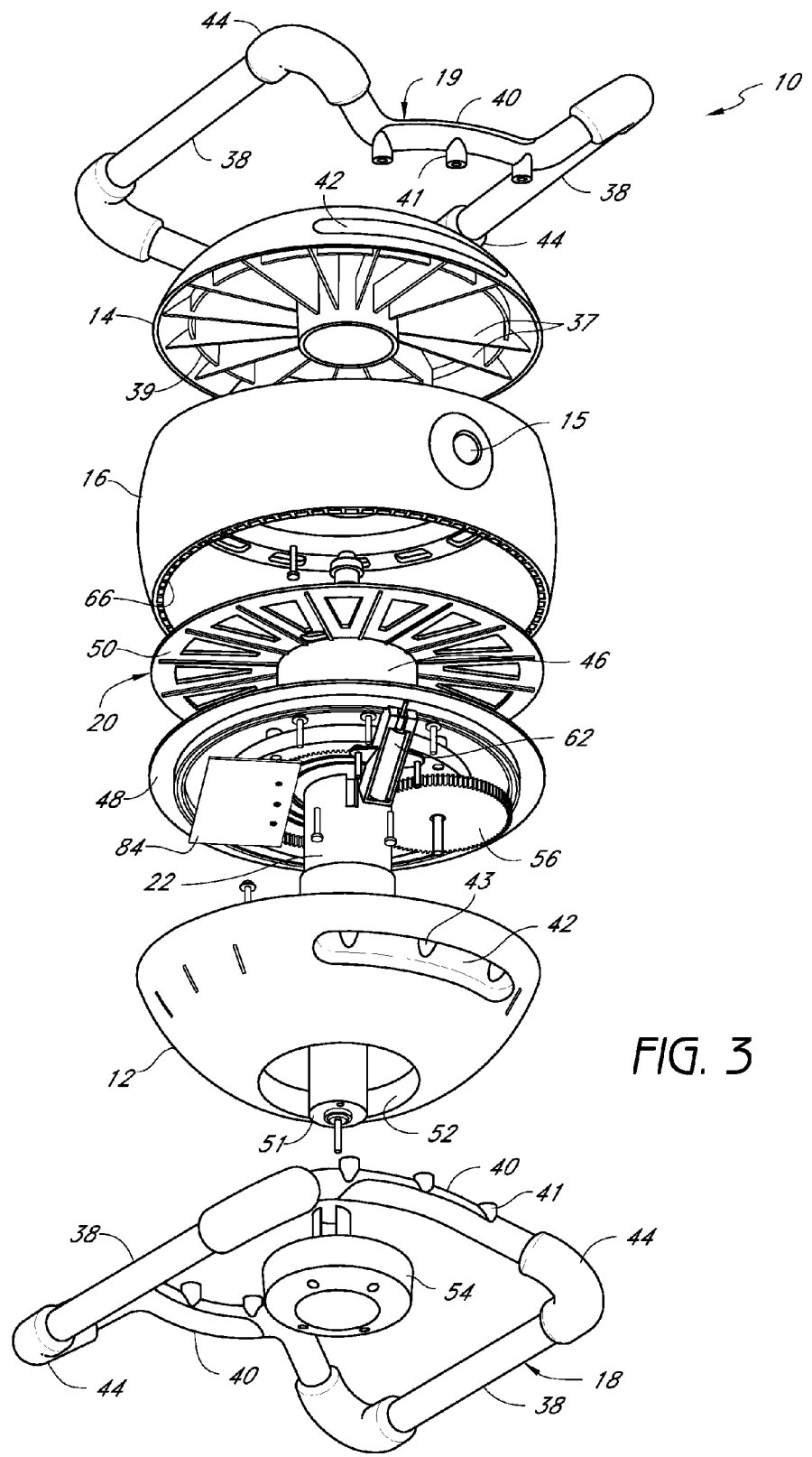
FIG. 3 is an exploded bottom perspective view of the reel of FIG. 1.
Figure 4:
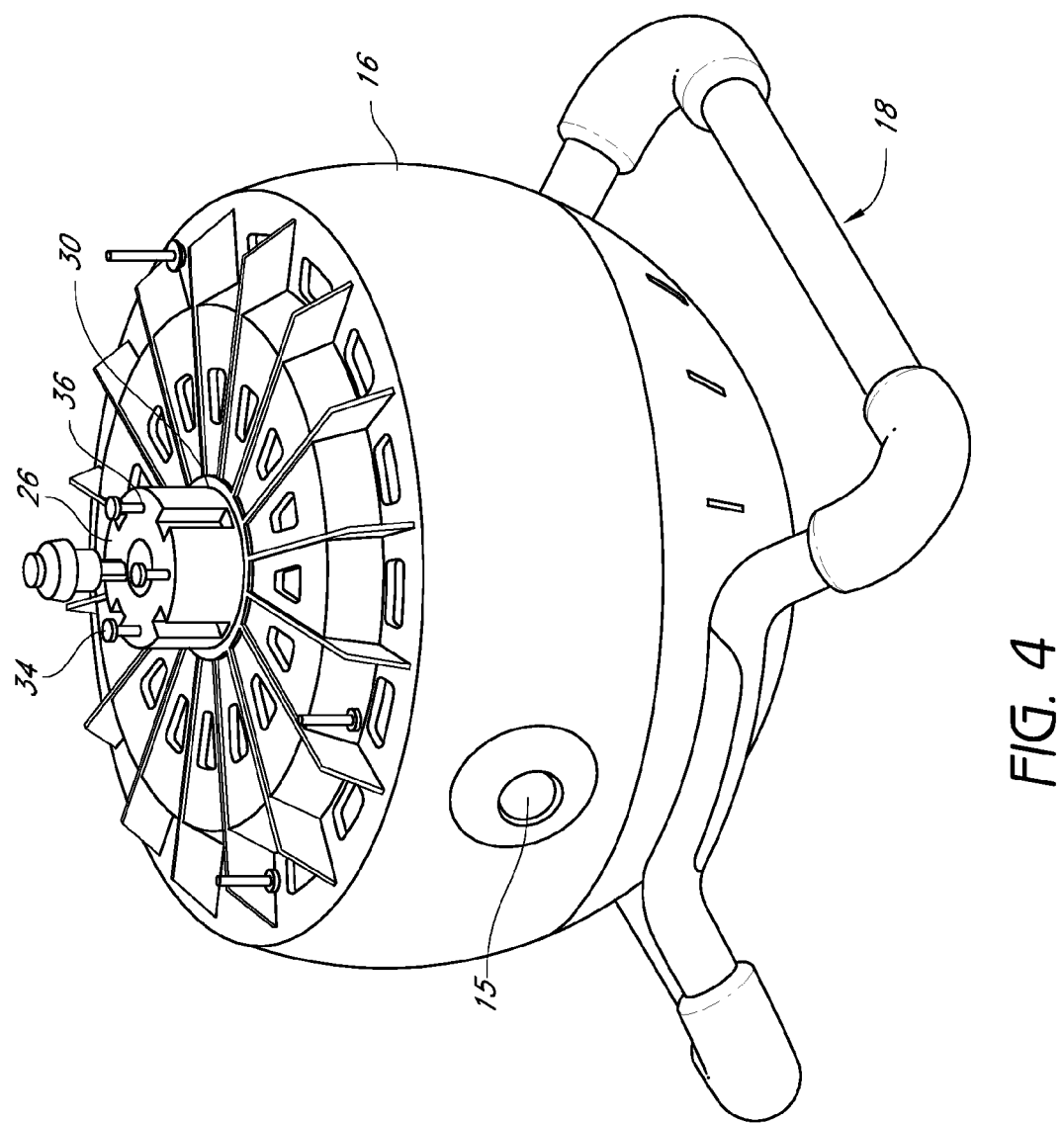
FIG. 4 is a top perspective view of the reel of FIG. 1, with the upper housing portion removed.

FIGS. 2 and 3 are exploded top and bottom views, respectively, of the reel 10. The reel 10 includes a spindle member 22 having a first end 24 and a second end 26 (FIG. 4). The first end 24 is connected to, and preferably integrally formed with, the lower housing portion 12. In this embodiment, the spindle member 22 is configured to extend through an opening 28 (FIGS. 8 and 9) in the drum 20 so that the drum is rotatable about a spindle axis defined by the spindle member. Preferably, the opening 28 is sized to closely receive the spindle member 22. The spindle member 22 is also configured to extend through an opening 30 (FIG. 4) of the middle housing portion 16. Preferably, the opening 30 is sized to closely receive the spindle member 22. In one embodiment, the spindle member 22 has a lower larger diameter portion for a close fit with the opening 28 of the drum 20, and an upper smaller diameter portion for a close fit with the opening 30 of the middle housing portion 16, it being understood that the opening 28 is larger than the opening 30. In another embodiment, the openings 28 and 30 are approximately the same size, and the spindle member 22 has a substantially uniform diameter. Skilled artisans will appreciate that other configurations of the spindle member 22 and openings 28 and 30 are possible, keeping in mind the goal of permitting both the middle housing portion 16 and drum 20 to rotate with respect to the spindle member 22 and independently with respect to each other.

With reference to FIGS. 2-4, the upper housing portion 14 is preferably adapted to connect to the second end 26 of the spindle member 22 when the member 22 extends through the drum 20. Preferably, the upper housing portion 14 and the spindle member 22 are detachably secured to one another so that they cannot rotate with respect to each other. In the illustrated embodiment, the upper housing portion 14 includes four through-holes 32 sized and configured to receive screws 34 (FIG. 4) that are in turn adapted to screw into threaded holes 36 in the second end 26 of the spindle member 22. Skilled artisans will appreciate that any of a wide variety of means can be employed for detachably securing the upper housing portion 14 to the spindle member 22.

The reel 10 thus permits the middle housing portion 16 and drum 20 to rotate freely about the spindle member 22 and independently with respect to each other. In order to assist or facilitate the rotation of the drum 20 and/or middle housing portion 16, rotation-assistance elements such as ball bearings, rollers, and the like may (but need not) be provided at interfaces between the housing portions 12 and 16, between the housing portions 14 and 16, between the middle housing portion 16 and the drum 20, between the lower housing portion 12 and the drum 20, between the spindle member 22 and the drum 20, and/or between the spindle member 22 and the middle housing portion 16. Also, tracks or other guide means can be provided to control the relative movement of these members. Lubricants can also be used to reduce friction at these interfaces.

With continued reference to FIGS. 2 and 3, each of the upper and lower housing portions 12, 14 preferably includes an annular wall 39 and a plurality of radial ribs 37 for added strength. Alternative configurations for internal walls and ribs are also possible, keeping in mind the goal of improving the strength and rigidity of the housing portions 12, 14. In other embodiments, the housing portions 12 and 14 do not have any internal members for added strength.

In the disclosed embodiments, the upper and lower support structures 18 and 19 are (but need not be) substantially similar. Accordingly, only the lower support structure 18 is described in detail herein. With reference to FIGS. 2 and 3, the lower support structure 18 preferably comprises two mounting portions 40 and two handle portions 38. The illustrated mounting portions 40 comprise elongated tubular members that are configured to be mounted on opposing sides of the lower housing portion 12. Skilled artisans will appreciate that the mounting portions 40 can alternatively have non-tubular shapes. In a preferred embodiment, the lower housing portion 12 includes recesses 42 that are sized and shaped to receive the mounting portions 40. The mounting portions 40 can be secured (preferably detachably) to the lower housing portion 12 by any of a wide variety of means, such as by screws, nut and bolt combinations, and the like. For example, the illustrated mounting portions 40 include vertical internally threaded stubs 41 that fit snugly into corresponding recesses 43 inside the recesses 42. The recesses 43 are configured to receive screws for creating a detachable connection between the mounting portions 40 and the lower housing portion 12. The mounting portions 40 can be curved to conform more closely to the semispherical shape of the lower housing portion 12, providing a more stable and secure connection.

The illustrated handle portions 38 are positioned generally on opposing sides of the lower housing portion 12 and are substantially parallel to one another. In the illustrated embodiment, the handle portions 38 comprise elongated tubular members oriented generally perpendicular to the spindle member 22 and positioned so as to maintain a lower extreme of the lower housing portion 12 at least slightly above the lower support surface. The handle portions 38 are preferably sized and shaped to allow a person to grip them directly with his or her hands. Each mounting portion 40 preferably has one end coupled to an end of one of the handle portions 38 and another end coupled to an end of the other of the handle portions 38. Each end of the handle portions 38 is preferably coupled to only one of the mounting portions 40. The end portions of the illustrated mounting portions 40 extend downward and outward from a central portion that mounts to the recess 42 of the lower housing portion 12.

In a preferred embodiment, the lower support structure 18 further comprises four coupling members 44, each of which couples one of the ends of one of the handle portions 38 to one of the ends of one of the mounting portions 40. In the illustrated embodiment, the coupling members 44 contact the lower support surface, while the handle portions 38 and mounting portions 40 do not. The illustrated coupling members 44 comprise elbow-shaped tubular members.

As mentioned above, the upper support structure 19 is preferably substantially similar to the lower support structure 18. Accordingly, the illustrated support structure 19 preferably includes handle portions 38, mounting portions 40 adapted to mount within recesses 42 of the upper housing portion 14, and coupling members 44, substantially as described above. The handle portions 38 of either support structure 18, 19 can advantageously be used to conveniently grip onto and move the reel 10. Preferably, the support structures 18, 19 are configured to prevent the housing 11 (e.g., housing portions 12, 14, and 16) from contacting a generally flat support surface regardless of the orientation of the reel 10. For example, the illustrated support structures 18, 19 prevent the housing 11 from contacting the ground even if the reel 10 is turned onto its side. In this configuration, the support structures more effectively protect the housing 11 from damage. In other embodiments, the upper support structure 19 is configured differently or can even be omitted from the reel 10. It will be appreciated that a wide variety of different types of support structures 18, 19 can be used without departing from the scope of the invention.

Figure 5:
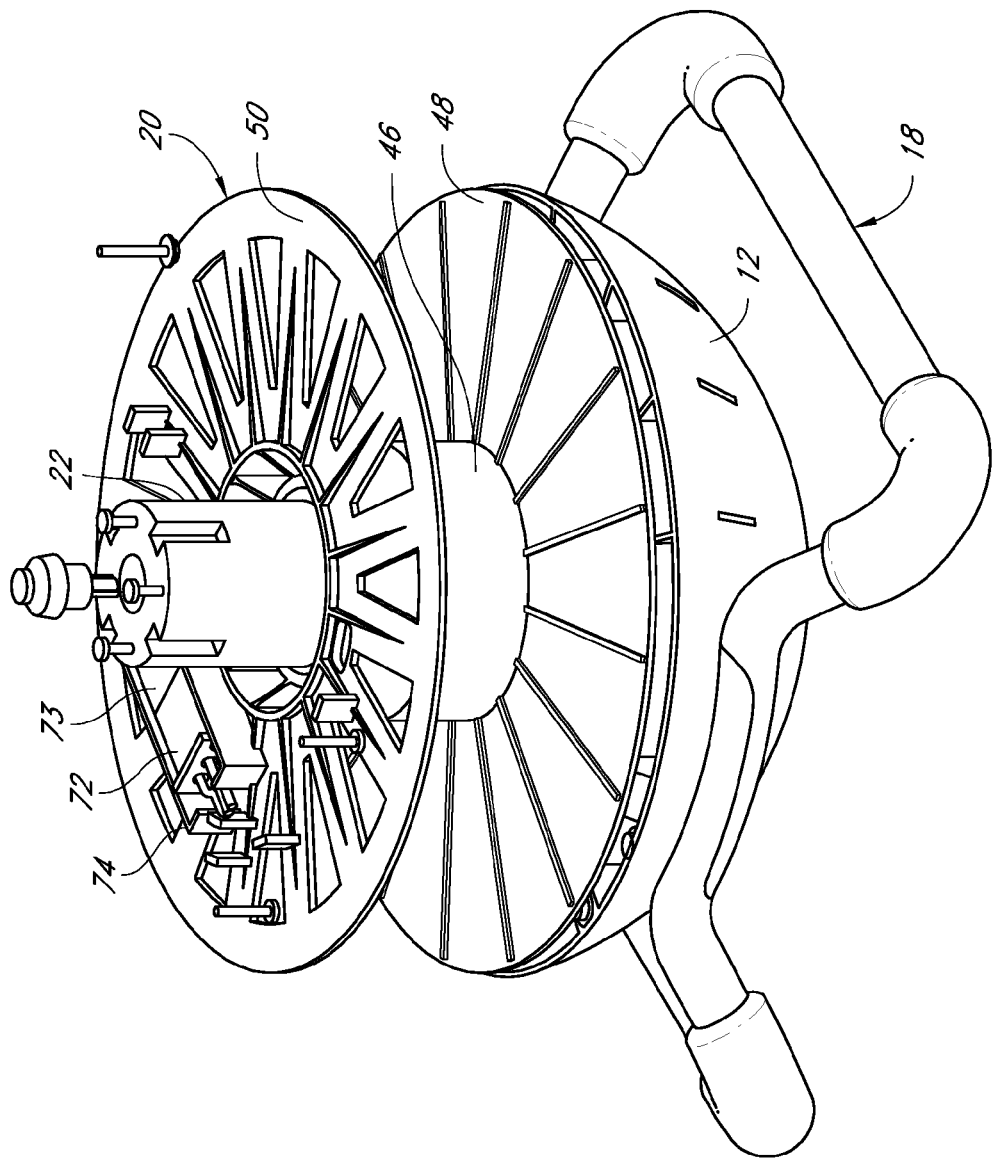
FIG. 5 is a top perspective view of the reel of FIG. 1, with the upper and middle housing portions removed.
Figure 8:
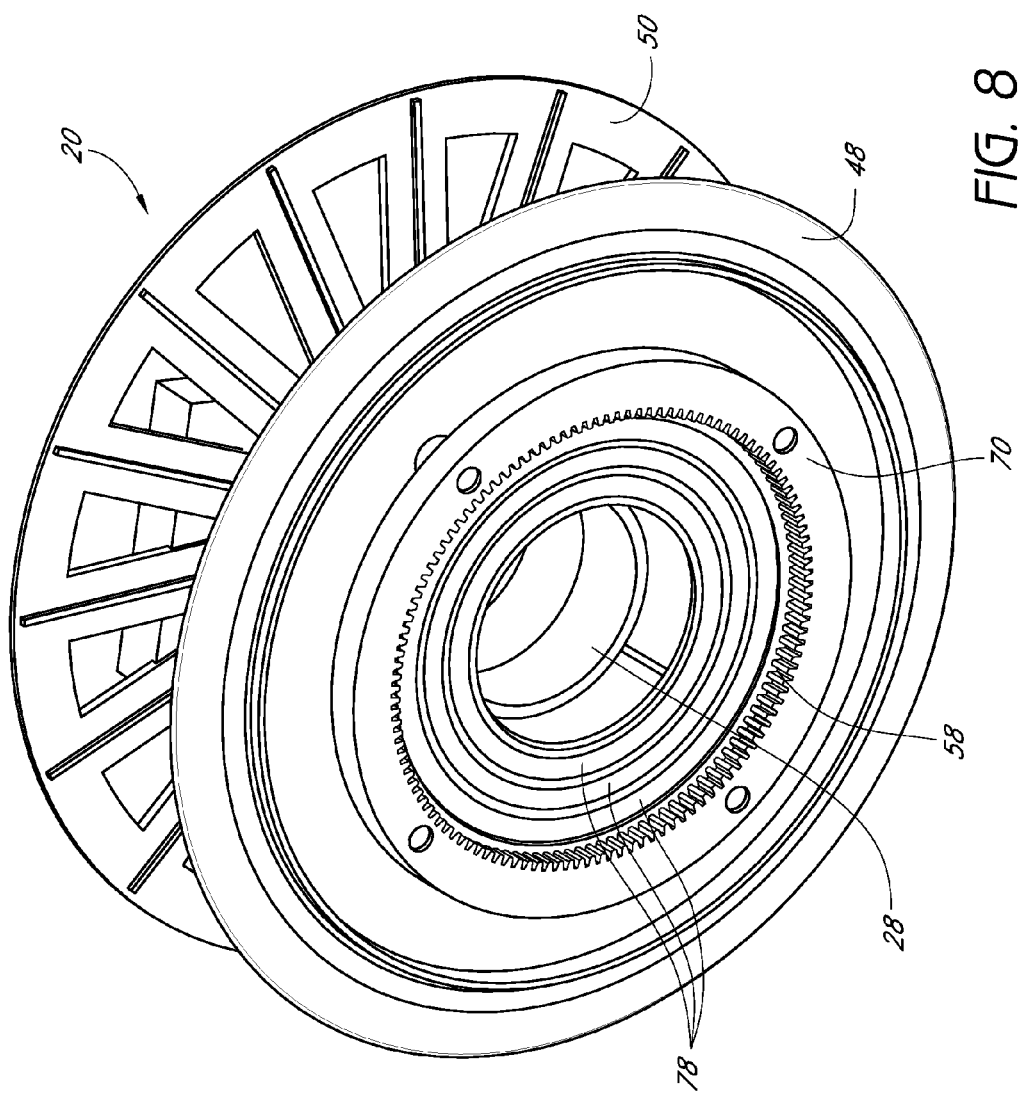
FIG. 8 is a bottom perspective view of the drum of the reel of FIG. 1.
Figure 9:
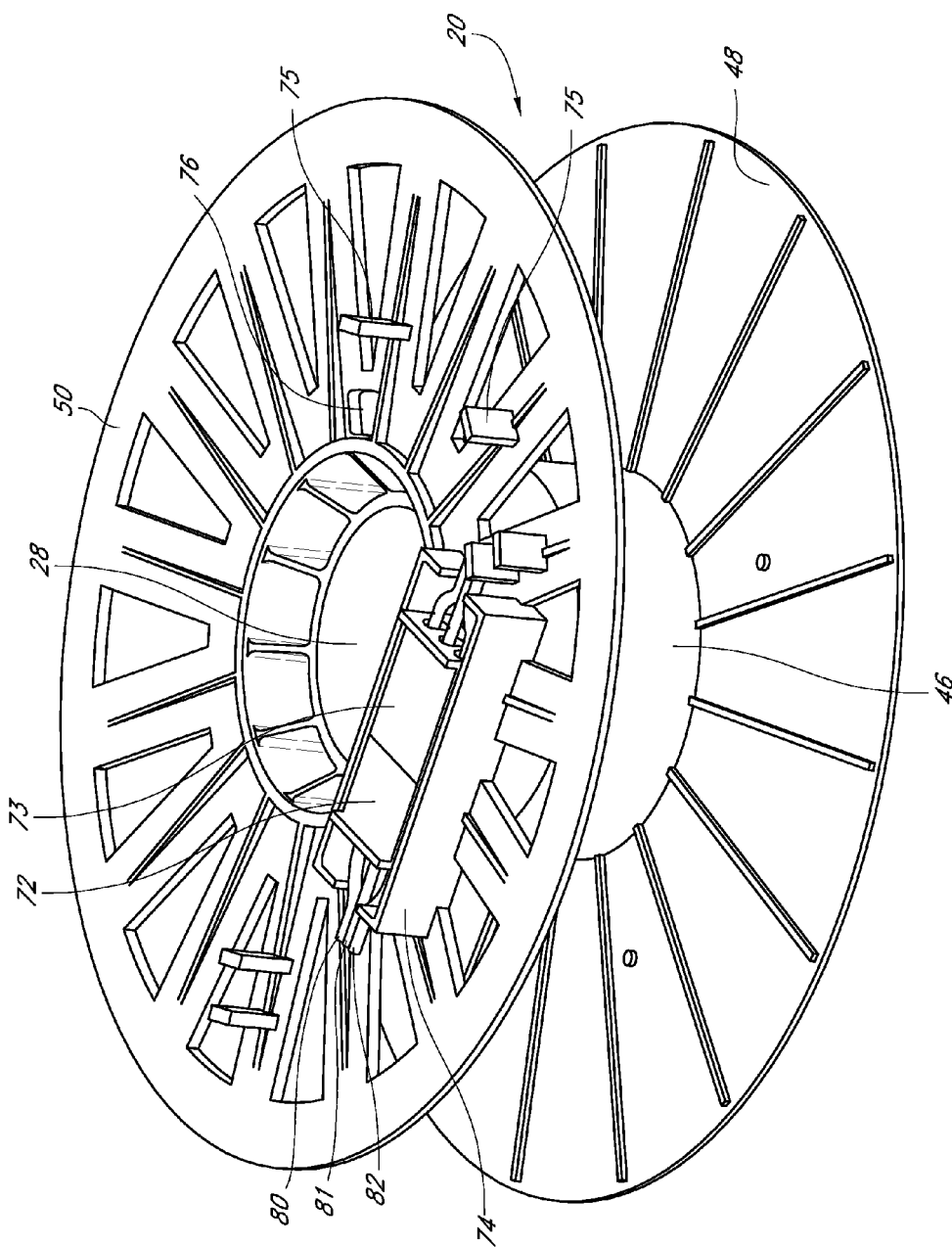
FIG. 9 is a top perspective view of the drum of the reel of FIG. 1.

FIGS. 5, 8, and 9 show a preferred embodiment of the reel drum 20. The illustrated drum 20 comprises a substantially cylindrical member 46 onto which linear material can be spooled, a first end plate 48 at one end of the member 46, and a second end plate 50 at the other end of the member 46. The cylindrical member 46 and end plates 48 and 50 preferably rotate in unison together about the spindle member 22. The cylindrical member 46 and end plates 48 and 50 can be formed integrally as a single unitary piece or can be formed separately and secured together. The middle housing portion 16 encircles the drum 20 and preferably rotates about the spindle member 22 independently of the drum 20. The aperture 15 is preferably positioned near the surface of a cylindrical member 46, so as to direct the linear material onto the drum 20 during spooling. As used herein, "spooling" refers to the process of rotating the drum 20 in a direction so as to gather the linear material 2 thereon, and "unspooling" refers to the process of rotating the drum 20 in a direction so as to remove the linear material therefrom.

With reference to FIGS. 3, 3A, and 6-8, the lower housing portion 12 is preferably adapted to house a motor 51 that drives the reel drum 20 through a gear reduction assembly. In the illustrated embodiment, the motor 51 is housed within the spindle member 22. The motor 51 is inserted into an opening 52 in the underside of the lower housing portion 12. A motor cover 54 can be provided to support the motor 51 and/or close and possibly seal the opening 52 to protect the motor and gears from dust and debris. The motor 51 drives a small output gear 53 (FIG. 7) within the spindle member 22. The output gear 53 is engaged with a larger countershaft gear 56. As used herein, the "engagement" of two gears means that the teeth of one gear are engaged with the teeth of the other gear. The countershaft gear 56 is rotatably mounted with respect to the lower housing portion 12, such as by a gear shaft 60 mounted in a bearing (not shown) in the housing portion 12. The illustrated spindle member 22 may include a slot or other access opening on one side that receives a radially outer portion of the countershaft gear 56, to facilitate the engagement of the gears 53 and 56. A smaller gear 57 is secured coaxially and non-rotatably to the top of the countershaft gear 56, such that the gears 56 and 57 rotate in unison. The smaller gear 57 is engaged with a ring gear 58 on the bottom side of the drum end plate 48. As shown more clearly in FIG. 8, the ring gear 58 comprises an annular wall on the bottom side of the end plate 48, with teeth facing radially inward from the annular wall. In the illustrated embodiment, the annular wall is part of a ring-shaped piece 70 that is secured to the bottom side of the end plate 48. In other embodiments, the piece 70 can be formed integrally with the end plate 48.

Figure 7:
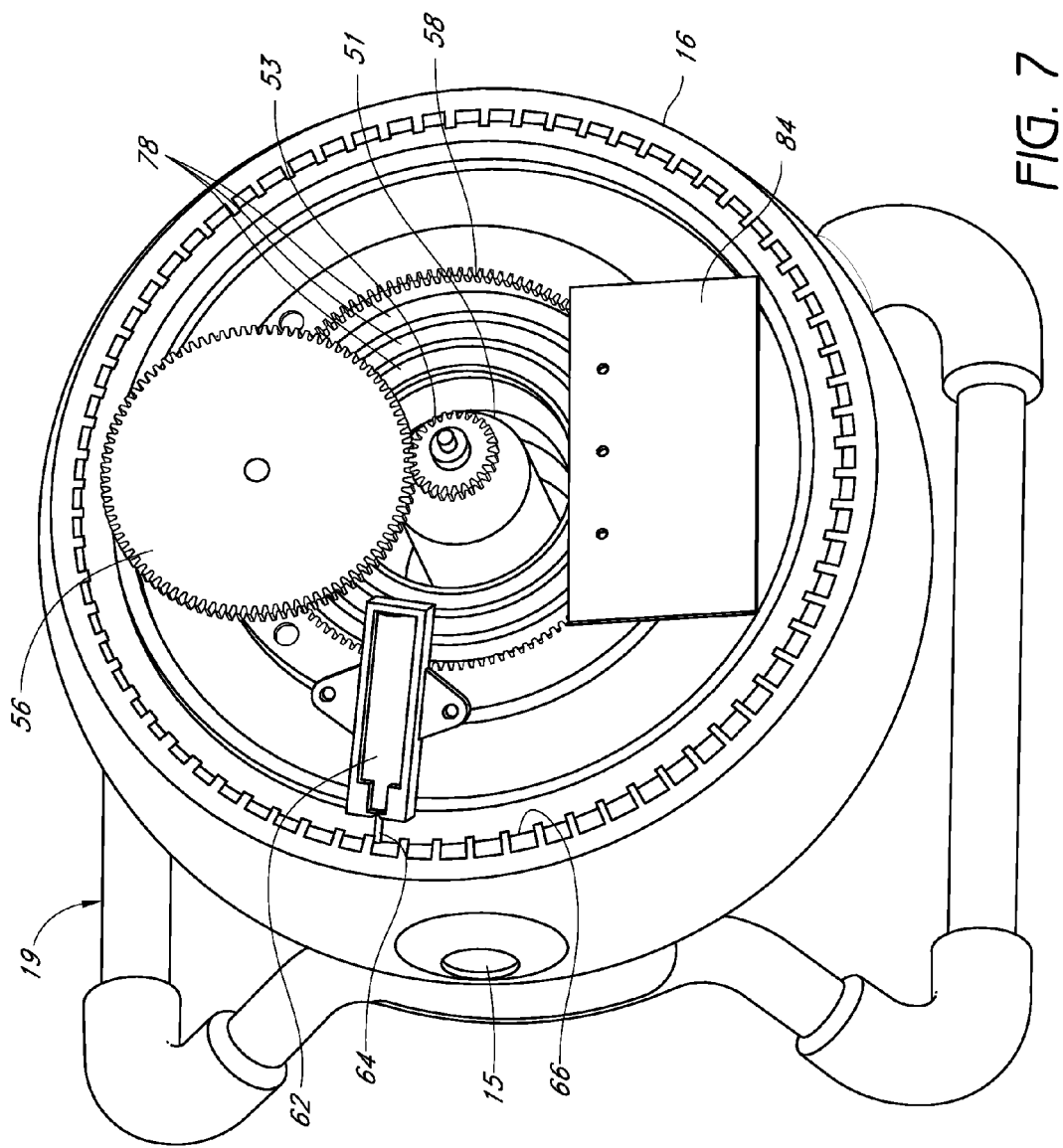
FIG. 7 is a bottom perspective view of the reel of FIG. 1, with most of the lower housing portion not shown.

Thus, the motor 51 drives the output gear 53, which in turn drives the countershaft gear 56, which produces coaxial rotation of the gear 57, which in turn drives the ring gear 58 of the drum end plate 48. In this manner, the motor 51 produces rotation of the drum 20 about the spindle member 22. As seen in FIG. 7, in the preferred embodiment the motor 51 is upside down (i.e., its output faces downward). However, it will be appreciated that the motor 51 can be oriented other than as shown. Skilled artisans will also understand that a variety of different types of motors and gear reduction assemblies can be employed without departing from the scope of the invention.

In the preferred embodiment, the gear reduction assembly produces a gear reduction preferably within the range of 20:1 to 45:1, more preferably within the range of 30:1 to 40:1, more preferably within the range of 32:1 to 38:1, more preferably within the range of 34:1 to 36:1, and even more preferably approximately 35:1. In this context, a 35:1 gear reduction means that 35 revolutions of the motor 51 results in one revolution of the drum 20. It has been found that gear reductions as high as 50:1 make it difficult to manually unspool the linear material from the drum 20, due to the gear reduction assembly itself and also in part to the internal resistance of the motor 51. On the other hand, gear reductions less than 20:1 may not provide enough power, in some applications, for spooling the linear material onto the drum 20. Suitable motors 51 are sold by Johnson Electric (website wwvv.johnsonelectric.com).

In one embodiment, the motor 51 is an electric motor. Also, a motor-controller can be provided for controlling the motor 51. For example, while spooling the linear material 2 onto the drum 20, a motor-controller can be employed to vary the motor speed based upon the length of unwound linear material. It will be appreciated that if the motor speed is constant, the inwardly pulled linear material 2 tends to move faster due to the increasing diameter of the spool itself. A motor-controller can adjust the motor speed to more safely control the motion of the linear material during spooling. Also, a motor-controller can be used to slow or stop the motor 51 just before the linear material 2 becomes completely spooled onto the drum 20. Otherwise, the linear material would get pulled into the housing 11 or, if there is an object at the end of the linear material (e.g., an electrical plug), it may whip against or otherwise impact the housing 11 or a person near the housing. In addition, a motor-controller can even be used to assist the user during unspooling (i.e., powered unspooling). One example of a motor-controller for a reel is disclosed in U.S. Provisional Patent Application No. 60/585,042, filed Jul. 2, 2004 (which is substantially identical to U.S. Pat. No. 7,350,736). Also, the motor 51 and/or motor-controller can be operated via a remote control. One example of such a remote control system for a motorized reel is disclosed in U.S. Pat. No. 7,503,338. In a preferred embodiment, a remote control is engaged on the spooled cord 2 at or near its outward end (e.g., near the plug connector 3 shown in FIG. 1). The remote control can send signals wirelessly (e.g., via radio frequency signals) or through a wire within the cord 2.

In use, a user can unspool the linear material 2 from the drum 20 by pulling the material out through the aperture 15 of the middle housing portion 16. In doing so, the drum 20 begins to rotate with respect to the upper and lower housing portions 12, 14 and the spindle member 22. The middle housing portion 16 is also freely rotatable, and its rotational position may vary because the aperture 15 will tend to follow the radial direction in which the user pulls the linear material 2. As the user moves around the reel 10 holding a portion of the linear material that is withdrawn from the housing 11, the middle housing portion 16 freely rotates to allow the aperture 15 to follow the radial direction of the withdrawn linear material. In this manner, the freely rotatable middle housing portion 16 facilitates using the linear material within a larger area. For example, the reel 10 can be placed centrally within a room or outdoor area (e.g., on the ground or mounted to a ceiling) and the linear material can be relatively easily withdrawn toward any direction or portion of the room or area. When the user wishes to spool the linear material onto the drum 20, the user can switch on the motor 51 accordingly. The resultant rotation of the drum 20 causes the linear material to be pulled back into the housing 11 through the aperture 15 of the middle housing portion 16.

Figure 3A:
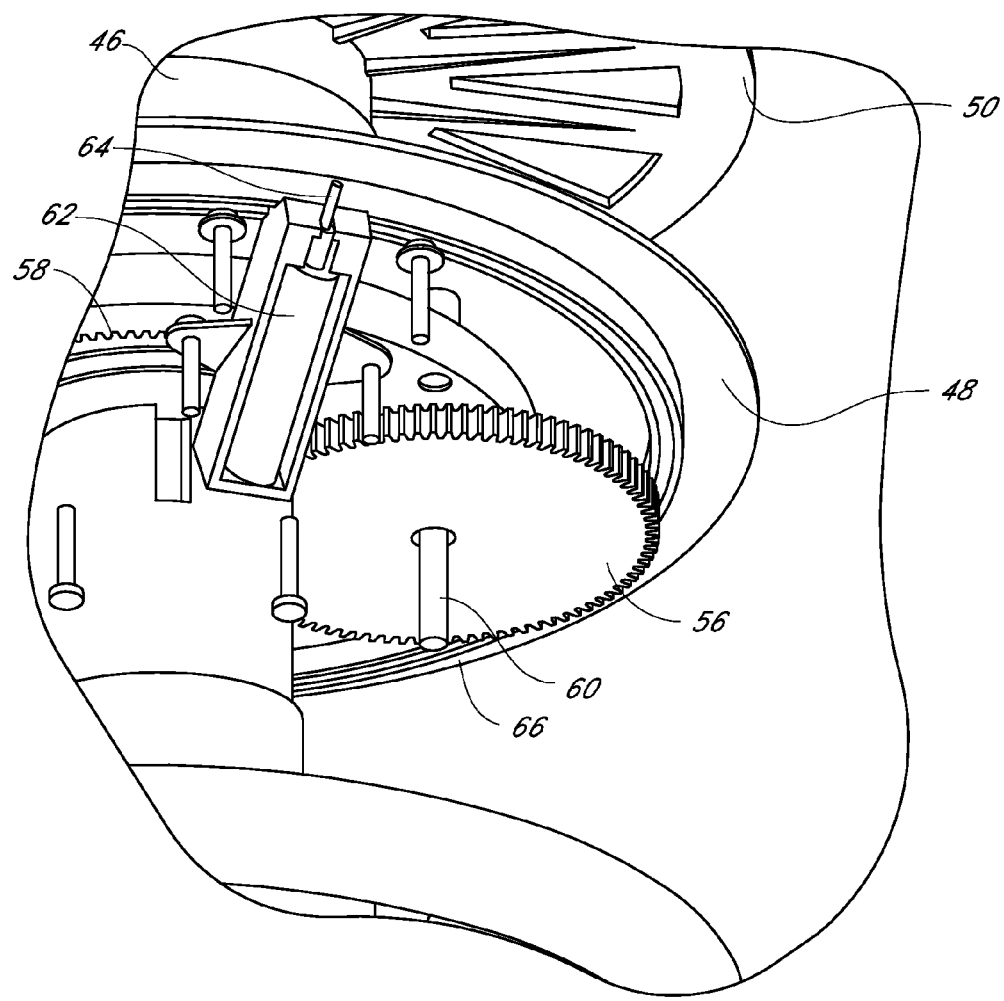
FIG. 3A is an expanded view of a portion of FIG. 3, showing the bottom of the drum.
Figure 6:
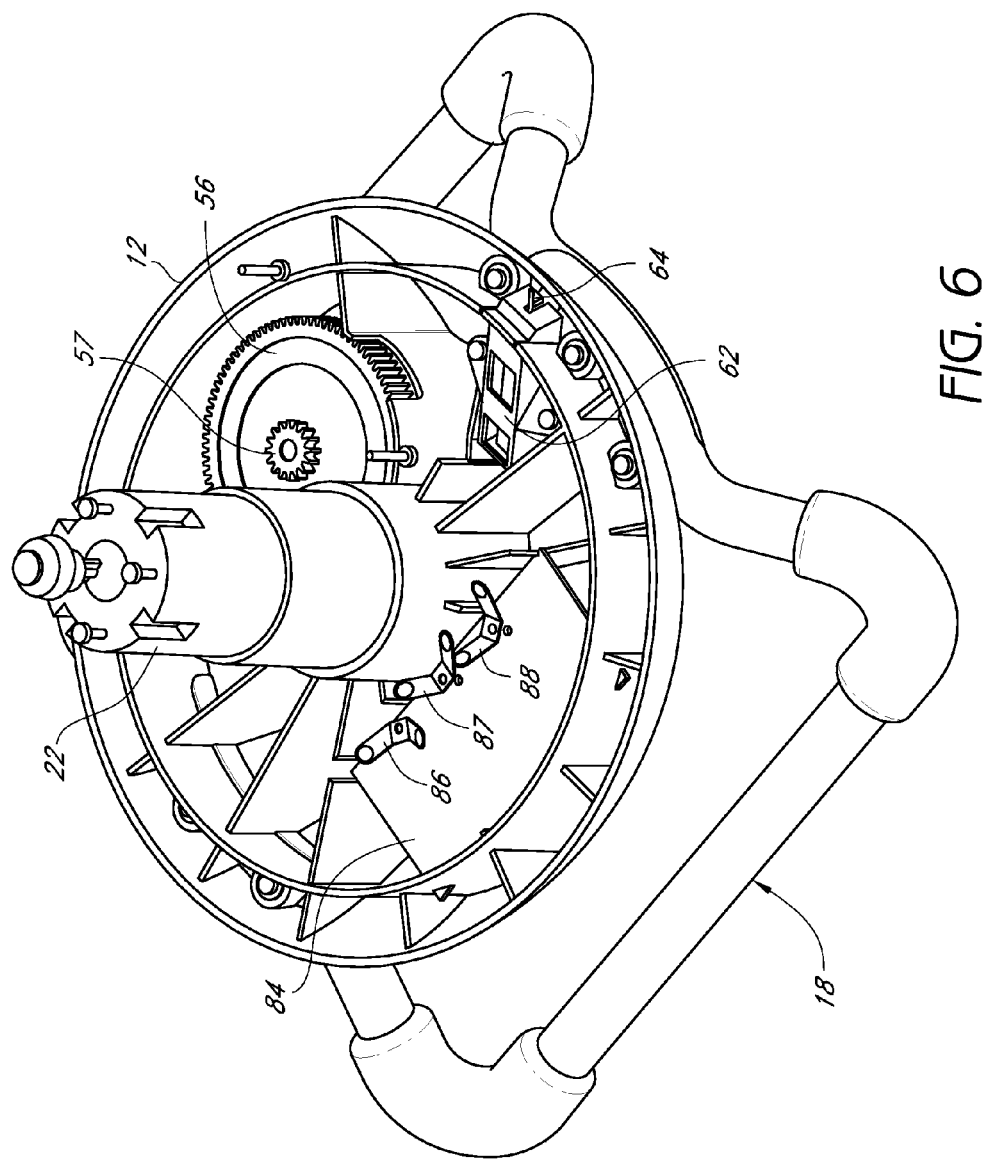
FIG. 6 is a top perspective view of the lower housing portion of the reel of FIG. 1.

During spooling, the middle housing portion 16 may tend to rotate along with the drum 20, due to friction therebetween. This can cause the linear material to swing around the reel 10, which can result in harm to surrounding persons or objects. Preferably, the reel 10 includes a mechanical and/or electrical mechanism to rotationally lock the middle housing portion 16 with respect to the upper and lower housing portions 12, 14 during spooling. With reference to FIGS. 3, 3A, 6, and 7, the illustrated embodiment includes a solenoid device 62 secured to the lower housing portion 12. FIG. 6 shows the outer appearance of the solenoid device 62, and FIGS. 3, 3A, and 7 show it partially in cross-section. The solenoid device 62 is electrically operable, as well known in the art, to cause a piston stem 64 to extend in and out of an outer opening of its housing. The stem 64 is sized and shaped to slide into any one of a ring of indentations 66 provided on the inner surface of the middle housing portion 16. The indentations 66 can have any of wide variety of shapes and sizes, keeping in mind the goal of permitting the solenoid stem 64 to stop the middle housing portion 16 from rotating by entering one of the indentations 66. When the stem 64 enters one of the indentations 66, it "locks" the middle housing portion 16. In other words, the extended stem 64 prevents the middle housing portion 16 from rotating with respect to the upper and lower housing portions 12, 14. An electronic control system can be provided to actuate the solenoid device 62 (i.e., cause the stem 64 to extend) when the motor 51 is switched to a spooling operation, and to retract the solenoid device 62 (i.e., cause the stem 64 to retract into its housing) when the motor 51 is switched off or to a powered unspooling operation.

In a preferred embodiment, the reel 10 is adapted to spool and provide power to an electrical cord 2 that delivers power to an external device. The reel 10 preferably includes a power connector for receiving an end of the spooled electrical cord 2, wherein the power connector is connected to a source of electrical power. With reference to FIG. 9, the end plate 50 of the drum 20 preferably includes a housing 74 for a power connector 72 and an electrical plug 73 formed at an end of an electrical cord 2 (FIG. 1) spooled on the drum 20. The power connector 72 is adapted to receive the cord plug 73, preferably with a snap-fit engagement. The power connector 72 is connected to a source of electrical power, as described in further detail below, and delivers such power to the plug 73 of the spooled cord 2. For example, the power connector 72 can receive power via three wires 80, 81, and 82, corresponding to a "hot" or powered AC current line, a neutral line, and a ground line, as known in the art. The electrical cord 2 extends from the plug 73 on a radially outward side of one or more strain-relief restraints 75, through an opening 76 in the end plate 50, and onto the cylindrical member 46 of the drum 20. By limiting tension in the cord 2, the strain-relief restraints 75 help to prevent the plug 73 from disconnecting from the power connector 72 when the cord 2 becomes completely unspooled. It will be understood that the power connector 72 can be adapted to receive either a standard or a non-standard electrical plug 73. In one embodiment, the power connector 72 is rated at 20 amps. Suitable power connectors 72 are sold by Molex (website www.molex.com).

With reference to FIG. 8, the bottom surface of the end plate 48 preferably includes three concentric, electrically conductive rings 78 (sometimes referred to as "slip rings") encircling the central opening 28. The slip rings 78 are preferably formed of an electrically conductive material, such as brass. Each of the slip rings 78 is preferably electrically connected through the walls and materials of the drum 20 to one of the three wires 80, 81, and 82 (FIG. 9) connected to the power connector 72. For example, electrical conduits can be formed within the end plates 48 and 50 and an annular wall that substantially defines the cylindrical member 46. Each of the slip rings 78 is configured to conduct one component of an electrical power signal (i.e., hot, neutral, and ground) to the power connector 72.

With reference to FIGS. 3 and 6, a support plate 84 is secured within the lower housing portion 12 and includes electrically conductive sliding contact elements 86, 87, and 88, each of which is configured to substantially continuously contact one of the slip rings 78 (FIG. 8) during rotation of the drum 20 about the spindle member 22. The sliding contact elements 86, 87, and 88 may comprise, for example, brushes or strips of sheet metal biased against the slip rings 78 by internal elastic bending stresses (as in leaf springs) or external biasing means (e.g, external springs). In any case, each sliding contact element 86, 87, 88 preferably maintains electrical contact with one of the slip rings 78, and each slip ring 78 is in electrical contact with only one of the sliding contact elements. The sliding contact elements are preferably electrically connected to an external source of electrical power. For example, each sliding contact element 86, 87, 88 can transmit one component of an electrical power transmission (e.g., hot, neutral, and ground lines). In a preferred embodiment, the sliding contact elements 86, 87, 88 are wired to the standard electrical cable 13 (FIG. 1) that extends out of a lower opening (not shown) of the lower housing portion 12. Thus, in this embodiment, electrical power is delivered from an external source (e.g., a standard power outlet) through the cable 13, sliding contact elements 86, 87, 88, slip rings 78, wires 80, 81, 82, and power connector 72 to an electrical cord 2 wound on the drum 20.

Figure 10:
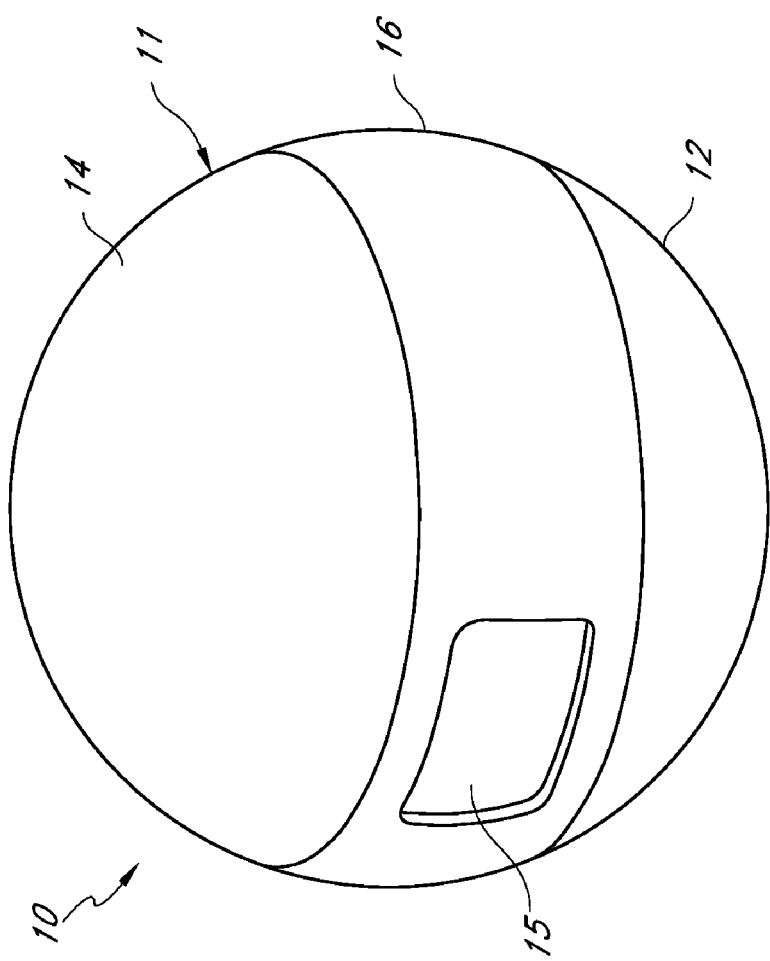
FIG. 10 is a perspective view of a reel housing according to another embodiment of the present invention.
Figure 11:
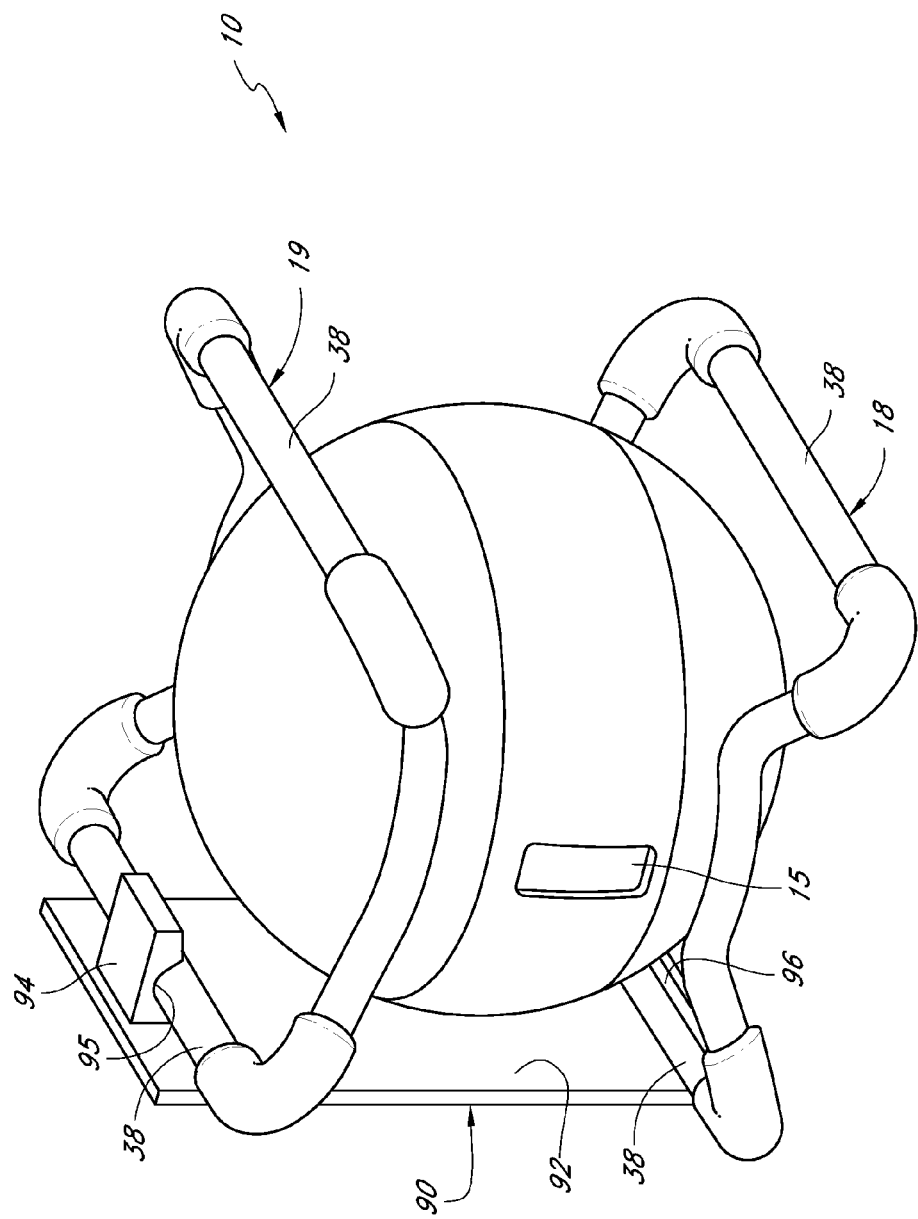
FIG. 11 is a top perspective view of a reel according to another embodiment of the present invention, engaged with a mounting element to secure the reel to a wall.
Figure 12:
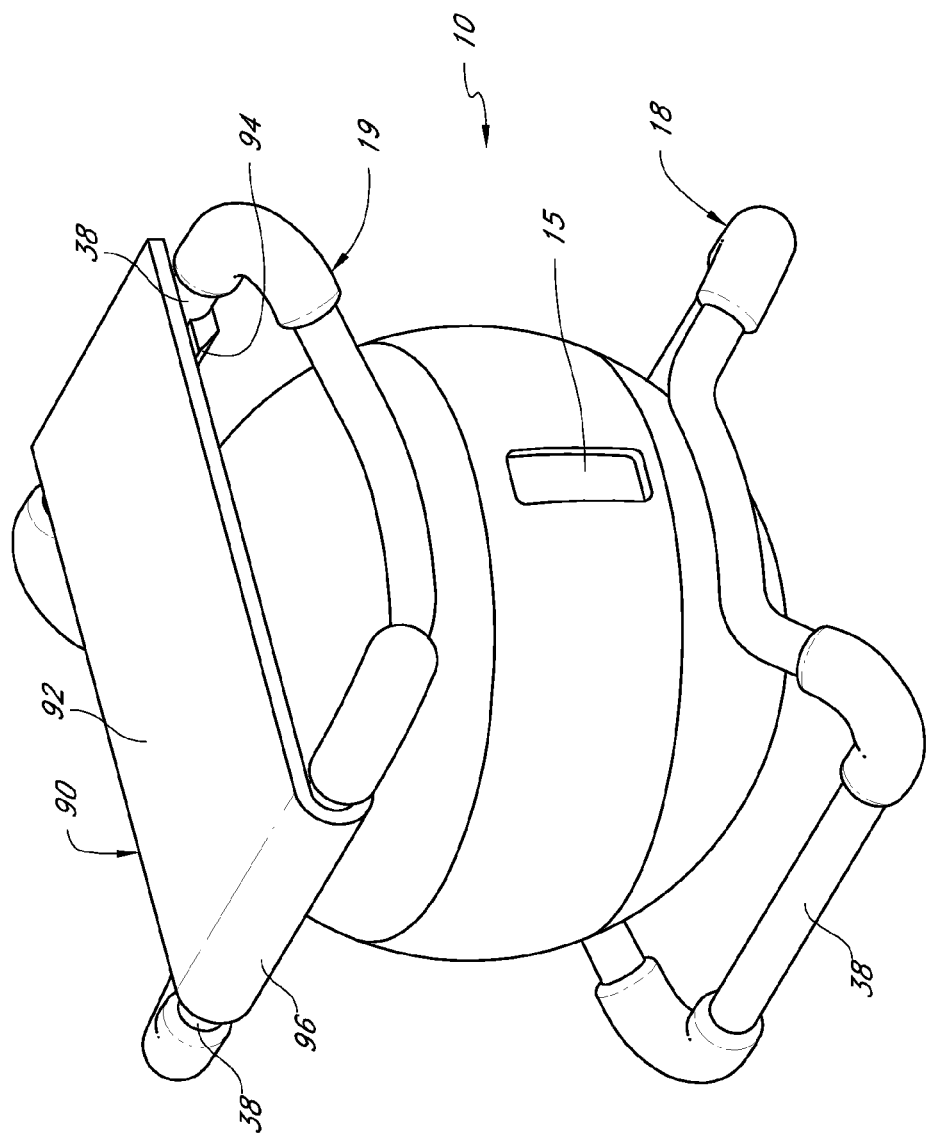
FIG. 12 is a top perspective view of the reel and mounting element of FIG. 11, with the mounting element engaged to secure the reel to a ceiling.

It will be appreciated that a wide variety of different sizes and shapes are possible for the aperture 15 of the middle housing portion 16. The aperture 15 can be sized and shaped to relatively closely surround the spooled linear material 2 (e.g., a standard size electrical cord). Alternatively, FIG. 10 shows a housing 11 whose aperture 15 is rectangular and oriented substantially perpendicular to the spindle member 22 (FIG. 2). FIGS. 11 and 12 show another alternative, in which the aperture 15 is rectangular and oriented substantially parallel to the spindle member 22. Other sizes and shapes for the aperture 15 are possible. In addition, friction-reducing elements (such as rollers) may be provided at the edges of the aperture 15 for reducing friction between the spooled cord 2 and the aperture edges.

FIGS. 11 and 12 show a reel 10 along with a mounting element 90 for securing the reel to a wall or ceiling. The mounting element 90 is configured to be secured to a wall or a ceiling, and is also configured to support the reel 10 by locking onto two of the handle portions 38 of the support structures 18, 19. The illustrated mounting element 90 comprises a generally planar element or plate 92 that is configured to be mounted to a wall or ceiling. For example, the planar element 92 can be mounted via nails, screws, nut and bolt combinations, and the like. The illustrated mounting element 90 also includes a latch member 94 and a hook member 96 at opposite ends of the planar element 92. The latch member 94 preferably defines a recess 95 that is sized and shaped to receive one of the handle portions 38. The hook member 96 is also preferably sized and shaped to receive one of the handle portions 38. The mounting element 90 is preferably configured so that when one of the handle portions 38 is received within the hook member 96, the reel 10 can be rotated about the hook member 96 so that one of the other handle portions 38 partially deflects the latch member 94 and then snaps into the recess 95 thereof, effectively locking the reel 10 onto the mounting element 90.

FIGS. 11 and 12 show the reel 10 removably secured to the mounting element 90. In FIG. 11, the mounting element 90 is shown locked onto one of the handle portions 38 of the lower support structure 18 and one of the handle portions 38 of the upper support structure 19. In FIG. 12, the mounting element 90 is shown locked onto both of the handle portions 38 of the upper support structure 19. It will be understood that the mounting element 90 can be configured to lock onto both of the handle portions 38 of the lower support structure 18. In the preferred embodiment, the reel 10 is configured so that the distance between each of the handle portions 38 of each support structure 18, 19 is substantially equal, so that the mounting element 90 can be removably secured to either support structure, as desired. Further, the distance between a handle portion 38 of the support structure 18 and a handle portion 38 of the support structure 19 on one side of the reel 10 is preferably substantially equal to such distance on the other side of the reel 10, so that the mounting element 90 can be removably secured (as in FIG. 11) on either side of the reel 10, as desired.

Figure 13:
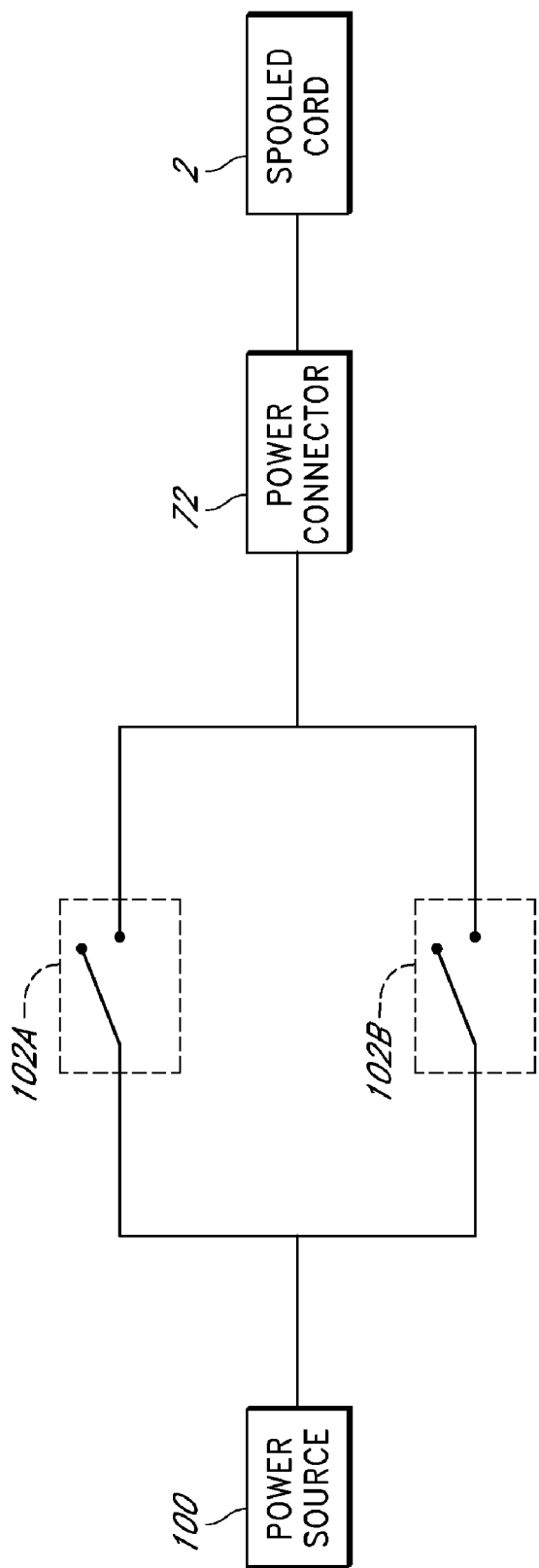
FIG. 13 is an electrical power flow diagram illustrating the use of a temperature regulation system in a reel of the present invention.
Figure 13A:
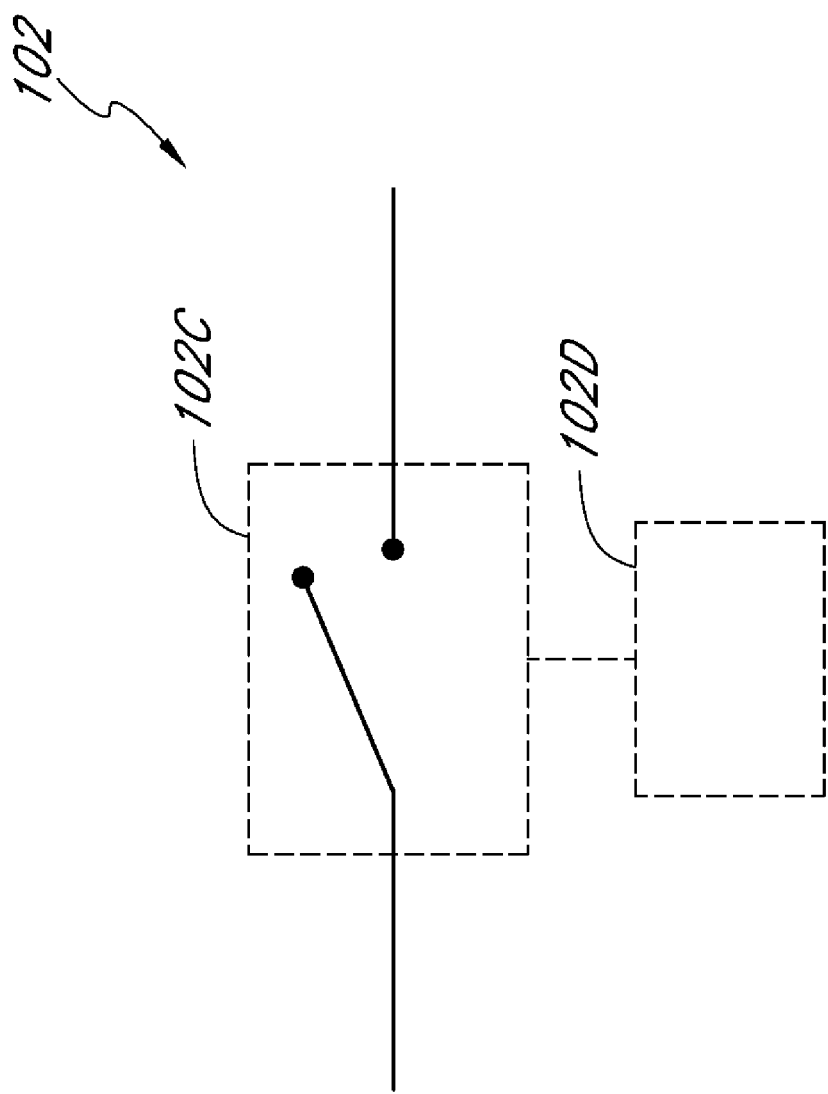
FIG. 13A is a schematic view of an embodiment of a switch that comprises a separate temperature sensor.

FIG. 13 is a power flow diagram illustrating the use of one or more temperature sensors for preventing overheating and melting of the spooled linear material 2. The illustrated apparatus includes an electrical power source 100 that provides power to the spooled cord 2. The power source 100 can be a common AC power source suitable for delivering power to the cord 13 (FIG. 1). One or more temperature-sensitive switches 102A, 102B, etc. are provided between the power source 100 and the power connector 72 (also shown in FIG. 9) to which the spooled cord 2 is connected. The switches 102 include temperature sensing elements, or temperature sensors. Each switch 102 is configured to open when its local temperature exceeds a given threshold. The activation temperature thresholds of the switches 102 are preferably such that if the power load on the cord 2 becomes too high, so as to heat the cord 2 and introduce the risk of melting the insulation thereof, the switches 102 move to their open positions to stop the current flow to the cord 2. In a preferred embodiment, the switches 102 are powered by electrical connection to the "hot" slip ring 78. It will be appreciated that a variety of different types of switches 102 can be used, such as units comprising separate temperature sensors 102D and switches 102C that operate based on the sensor 102D readings/signals, such as the embodiment shown in FIG. 13A. In a preferred embodiment, the switch 102 is a "bimetal thermostat switch" (also referred to as a "thermostat" or "thermal protector"), as known in the art. Suitable switches 102 are sold by Thermtrol Corporation of Canton, Ohio, U.S.A. It will be appreciated that the temperature activation threshold may depend upon the thermal qualities (e.g., melting point) of the spooled linear material 2, and possibly whether the reel is used indoors or outdoors. The temperature-sensitive switches 102 can be located anywhere on or within the reel, but are preferably located near the surface of the cylindrical member 46 on which the cord 2 is spooled.

In the illustrated embodiment, two temperature-sensitive switches 102A and 102B are connected in parallel. It has been discovered that the operation of a bimetal thermostat switch is sometimes affected by the current flow therethrough. In particular, high current flow through the switch can lower the temperature at which the switch opens. For example, if the current flow through the switch 102A is too high, the switch may begin to open at a reduced temperature, which in turn can lead to undesired power cut-offs to the cord 2. In order to overcome this problem, there are preferably two or more switches 102 connected in parallel, as shown. This greatly reduces the current flow through each switch 102 and reduces the risk of premature opening. In other words, a high local temperature that causes a switch 102 to open is not likely to be caused by the internal resistance and heat generation of the switch itself. In the embodiment of FIG. 13, if one switch 102A becomes too hot and then opens, all of the current then flows through the other switch 102B. The high current load will then cause the switch 102B to open due to increased current load. In this way, the multiple switches 102 in parallel provide redundancy in the temperature sensing. If one switch opens prematurely (i.e., for reasons other than an undesirably high local temperature not caused by the internal resistance and heat generation of the switch itself), then the other switch will still provide the temperature sensing and power cut-off functions. Any number of switches 102 can be connected in parallel to provide increased redundancy and further reduce the current flows through each switch.

In addition, the reel can include a ground fault interrupter (GFI) for safety purposes. The GFI can be located in the reel or even in the cord 2. GFI's are well known in the art. A GFI typically acts to disable a circuit when incoming current (e.g., through a "hot" line) is not equal to outgoing current (e.g., through a "neutral" line).

In some embodiments, the housing portions 12, 14, and 16 and spindle member 22 are formed of ABS (acrylonitrile butadiene styrene) plastic. However, other materials can be used, giving due consideration to the goal of providing a long-lasting, durable, yet affordable housing 11. The spindle member 22 is preferably formed integrally with the lower housing portion 12. The cylindrical member 46 and possibly the end plates 48 and 50 can be formed of polyolefin, but many other materials are possible. The gears may be formed of acetyl, such as Delrin® sold by Dupont, headquartered in Wilmington, Del.

It will be appreciated that the reel drum 20 may include guide grooves for the linear material, a retraction limiting band for preventing disconnection of the linear material 2 at complete unspooling, and/or a ramp on the drum surface to facilitate smooth transition between spool layers. As an example, these features are disclosed in U.S. Pat. No. 6,981,670.

While the preferred embodiments have been described above in the context of an electrical cord reel, skilled artisans will appreciate that many of the above-described aspects of the present invention are applicable for reels for other types of linear materials.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

What is claimed is:

1. A reel assembly for an electrical cord distinct from the reel assembly, comprising:
    a reel onto which the electrical cord can be spooled;
    a power connector on the reel, the power connector configured to be mechanically and electrically coupled to the electrical cord, the reel assembly configured to be connected to a power source and to convey electrical power from the power source to the power connector; and
    two or more switches connected in an electrically parallel arrangement such that electrical currents flow through the switches in the same direction when the switches are in positions that permit electrical current flow through the switches, the switches configured to shut off power from the power source to the power connector if a temperature of the reel assembly or of the electrical cord exceeds a threshold.

2. The reel assembly of claim 1, wherein each of the switches is configured to open when it detects a temperature that exceeds the threshold.

3. The reel assembly of claim 1, wherein at least one of the switches comprises a temperature sensitive switch configured to detect a temperature of the electrical cord spooled onto the reel.

4. The reel assembly of claim 1, wherein at least one of the switches comprises a temperature sensitive switch configured to detect a temperature on or within a housing of the reel assembly.

5. The reel assembly of claim 1, wherein at least one of the switches comprises a temperature sensitive switch configured to detect a temperature near a surface of the reel.

6. The reel assembly of claim 1, further comprising a sensor formed separately from the switches, the sensor configured to read a temperature and send a temperature signal indicative of the read temperature, at least one of the switches configured to receive the temperature signal and move to an open position if the temperature exceeds a threshold.

7. The reel assembly of claim 1, wherein at least one of the switches comprises a thermostat.

8. The reel assembly of claim 1, further comprising a ground fault interrupter configured to disable a flow of electrical current from the power source to the power connector when an incoming electrical current to said ground fault interrupter does not equal an outgoing electrical current from said ground fault interrupter.

9. The reel assembly of claim 1, further comprising a set of concentric, electrically conductive rings on an end plate of the reel, wherein the rings convey the electrical power from the power source to the power connector.

10. The reel assembly of claim 1, further comprising the electrical cord.

11. A reel assembly for an electrical cord distinct from the reel assembly, comprising:
  a reel onto which the electrical cord can be spooled;
  a power connector configured to provide power to the electrical cord from a power source; and
  two or more pairs of switches and sensors, each pair comprising a switch and a corresponding sensor, each sensor configured to detect a temperature of the reel assembly or of the electrical cord and generate a temperature signal indicative of the detected temperature, and each switch configured to receive the temperature signal from the sensor with which the switch is paired;
  wherein the switches of the pairs of switches and sensors are connected in an electrically parallel arrangement such that electrical currents flow through the switches in the same direction when the switches are in positions that permit electrical current flow through the switches, the switches being configured to shut off power from the power source to the electrical cord if each of the sensors detects a temperature that exceeds a threshold.

12. A reel for an electrical cord distinct from the reel, comprising:
  a rotatable element onto which the electrical cord can be spooled;
  an input power connector configured to be connected to an electrical power source;
  an output power connector on the rotatable element, the output power connector configured to be mechanically and electrically coupled to the electrical cord spooled at least partially onto the rotatable element, the reel being configured to convey electrical current from the input power connector to the output power connector; and
  a temperature sensor and a switch located on the reel and not within the electrical cord, the switch being electronically positioned between the input power connector and the output power connector, the switch having a closed position in which electrical current can flow through the switch from the input power connector to the output power connector, the switch having an open position in which the switch prevents electrical current flow through the switch from the input power connector to the output power connector, the switch configured to occupy its open position when the temperature sensor detects a temperature exceeding a threshold.

13. The reel of claim 12, wherein the temperature sensor is configured to detect a temperature on or within a housing of the reel.

14. The reel of claim 12, wherein the temperature sensor is configured to detect a temperature near a surface of the rotatable element.

15. The reel of claim 12, further comprising a ground fault interrupter configured to disable a flow of electrical current from the input power connector to the output power connector when an incoming electrical current to said ground fault interrupter differs substantially from an outgoing electrical current from said ground fault interrupter.

16. The reel of claim 12, further comprising a set of concentric, electrically conductive rings on an end plate of the rotatable element, wherein the rings convey the electrical power from the input power connector to the output power connector.

17. The reel of claim 12, further comprising the electrical cord, the electrical cord being mechanically and electrically coupled to the output power connector.

18. A reel for an electrical cord distinct from the reel, comprising:
  a rotatable element onto which the electrical cord can be spooled;
  an input power connector configured to be connected to an electrical power source;
  an output power connector on the rotatable element, the output power connector configured to be mechanically and electrically coupled to the electrical cord spooled at least partially onto the rotatable element, the output power connector having a substantially fixed position with respect to the rotatable element, the reel being configured to convey electrical current from the input power connector to the output power connector; and
  a temperature sensor and a switch located on the reel, the switch being electronically positioned between the input power connector and the output power connector, the switch having a closed position in which electrical current can flow through the switch from the input power connector to the output power connector, the switch having an open position in which the switch prevents electrical current flow through the switch from the input power connector to the output power connector, the switch configured to occupy its open position when the temperature sensor detects a temperature exceeding a threshold.

19. A reel for an electrical cord distinct from the reel, comprising:
  a rotatable element onto which the electrical cord can be spooled;
  an input power connector configured to be connected to an electrical power source;
  an output power connector on the rotatable element, the output power connector is configured to be mechanically and electrically coupled to the electrical cord and is not part of the electrical cord spooled at least partially onto the rotatable element, the reel being configured to convey electrical current from the input power connector to the output power connector; and a temperature sensor and a switch located on the reel, the switch being electronically positioned between the input power connector and the output power connector, the switch having a closed position in which electrical current can flow through the switch from the input power connector to the output power connector, the switch having an open position in which the switch prevents electrical current flow through the switch from the input power connector to the output power connector, the switch configured to occupy its open position when the temperature sensor detects a temperature exceeding a threshold.

* * * * *

UNITED STATES PATENT AND TRADEMARK OFFICE
CERTIFICATE OF CORRECTION

PATENT NO. : 8,201,673 B2  
APPLICATION NO. : 13/032531  
DATED : June 19, 2012  
INVENTOR(S) : Ramon Anthony Caamano and James B. A. Tracey It is certified that error appears in the above-identified patent and that said Letters Patent is hereby corrected as shown below:

Title Page, Item (63) under Related U.S. Application Data please change "Continuation of application No. 12/199,184, filed on Aug. 27, 2008, now abandoned." to --Continuation of application No. 12/199,184, filed on Aug. 27, 2008, now abandoned which is a continuation of application No. 11/187,187, filed July 21, 2005, now Pat. No. 7,419,038, which claims benefit of provisional application No. 60/686,236, filed May 31, 2005.--.

At Column 8, Line 20, please change "wwvv" to --www--.

Signed and Sealed this  
Thirtieth Day of October, 2012

David J. Kappos  
*Director of the United States Patent and Trademark Office*